(12) United States Patent
Takeuchi

(10) Patent No.: US 12,334,764 B2
(45) Date of Patent: Jun. 17, 2025

(54) BATTERY DEPLETION PREVENTION SYSTEM, BATTERY DEPLETION PREVENTION METHOD, AND NON-TRANSITORY RECORDING MEDIUM

(71) Applicant: SUBARU CORPORATION, Tokyo (JP)

(72) Inventor: Keita Takeuchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 19 days.

(21) Appl. No.: 18/325,334

(22) Filed: May 30, 2023

(65) Prior Publication Data
US 2023/0402858 A1   Dec. 14, 2023

(30) Foreign Application Priority Data

Jun. 13, 2022 (JP) ................................ 2022-095051

(51) Int. Cl.
*B60R 16/033* (2006.01)
*H02J 7/00* (2006.01)

(52) U.S. Cl.
CPC .......... *H02J 7/0032* (2013.01); *B60R 16/033* (2013.01); *H02J 7/00306* (2020.01)

(58) Field of Classification Search
CPC .......................... B60R 16/033; H02J 7/00306
USPC ............................... 307/9.1, 10.1, 10.6, 10.7
See application file for complete search history.

(56) References Cited

U.S. PATENT DOCUMENTS

2007/0188150 A1* 8/2007 Yamaguchi ......... H02J 7/00304
                                                      320/136
2018/0115178 A1* 4/2018 Moon ................. H02J 7/00302

FOREIGN PATENT DOCUMENTS

JP       H11-334498 A     12/1999
JP        3570665 B2  *    9/2004

* cited by examiner

*Primary Examiner* — Elim Ortiz
(74) *Attorney, Agent, or Firm* — Rimon P.C.

(57) ABSTRACT

A battery depletion prevention system for a vehicle includes a turn-off control apparatus, a power-supply monitoring apparatus, and a first switch. The power-supply monitoring apparatus is configured to monitor a value of a current flowing through a battery. The first switch is provided between the battery and an in-vehicle apparatus and not between the battery and a communication apparatus. The turn-off control apparatus is configured to determine, based on the detected value of the current whether current value abnormality is occurring. The turn-off control apparatus is configured to, upon determining that the current value abnormality is occurring, turn off the first switch and thereby achieve a first coupling state. The turn-off control apparatus is configured to, upon determining that the current value abnormality is no longer occurring in the first coupling state, perform abnormality notification to a user terminal of a user of the vehicle via the communication apparatus.

15 Claims, 3 Drawing Sheets

BATTERY DEPLETION PREVENTION SYSTEM, BATTERY DEPLETION PREVENTION METHOD, AND NON-TRANSITORY RECORDING MEDIUM

CROSS-REFERENCE TO RELATED APPLICATIONS

The present application claims priority from Japanese Patent Application No. 2022-095051 filed on Jun. 13, 2022, the entire contents of which are hereby incorporated by reference.

BACKGROUND

The disclosure relates to a battery depletion prevention system for a vehicle, a battery depletion prevention method, and a non-transitory recording medium containing a battery depletion prevention program.

A battery is used for traveling of a vehicle and operations of electric equipment mounted in the vehicle. When a voltage supplied from the battery decreases due to a cause such as use of the electric equipment during stopping of the vehicle or deterioration of the battery, an engine cannot start, for example. Recently, a vehicle is provided with a plurality of electronic control units (ECUs). Such ECUs consume electric power as a dark current such as a standby current also before the vehicle starts. Japanese Unexamined Patent-tent Application Publication No. H11-334498 discloses a battery depletion prevention apparatus that makes it possible to prevent battery depletion, taking into consideration such a dark current load.

SUMMARY

An aspect of the disclosure provides a battery depletion prevention system for a vehicle. The battery depletion prevention system includes a turn-off control apparatus, a power-supply monitoring apparatus, and a first switch. The power-supply monitoring apparatus is configured to monitor a value of a current flowing through a battery. The first switch is provided between the battery and an in-vehicle apparatus and not between the battery and a communication apparatus. The turn-off control apparatus is configured to determine, based on the value of the current detected by the power-supply monitoring apparatus, whether current value abnormality is occurring. The turn-off control apparatus is configured to, upon determining that the current value abnormality is occurring, turn off the first switch and thereby achieve a first coupling state. The turn-off control apparatus is configured to, upon determining that the current value abnormality is no longer occurring in the first coupling state, perform abnormality notification to a user terminal of a user of the vehicle via the communication apparatus.

An aspect of the disclosure provides a battery depletion prevention method. The battery depletion prevention method includes causing a computer to: determine whether current value abnormality is occurring in a battery after a power supply of a vehicle is turned off; when the current value abnormality is determined as being occurring in the battery, turn off a first switch and thereby achieve a first coupling state, the first switch being provided between the battery and an in-vehicle apparatus and not between the battery and a communication apparatus; determine whether the current value abnormality is occurring in the battery after the first coupling state is achieved; and when the current value abnormality is not determined as being occurring, perform abnormality notification to a user terminal of a user of the vehicle via the communication apparatus.

An aspect of the disclosure provides a non-transitory computer-readable recording medium containing a program, the program causing, when executed by a computer, the computer to implement a method, the method including: determining whether current value abnormality is occurring in a battery after a power supply of a vehicle is turned off; when the current value abnormality is determined as being occurring in the battery, turning off a first switch and thereby achieving a first coupling state, the first switch being provided between the battery and an in-vehicle apparatus and not between the battery and a communication apparatus; determining whether the current value abnormality is occurring in the battery in the first coupling state; and when the current value abnormality is not determined as being occurring, performing abnormality notification to a user terminal of a user of the vehicle via the communication apparatus.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
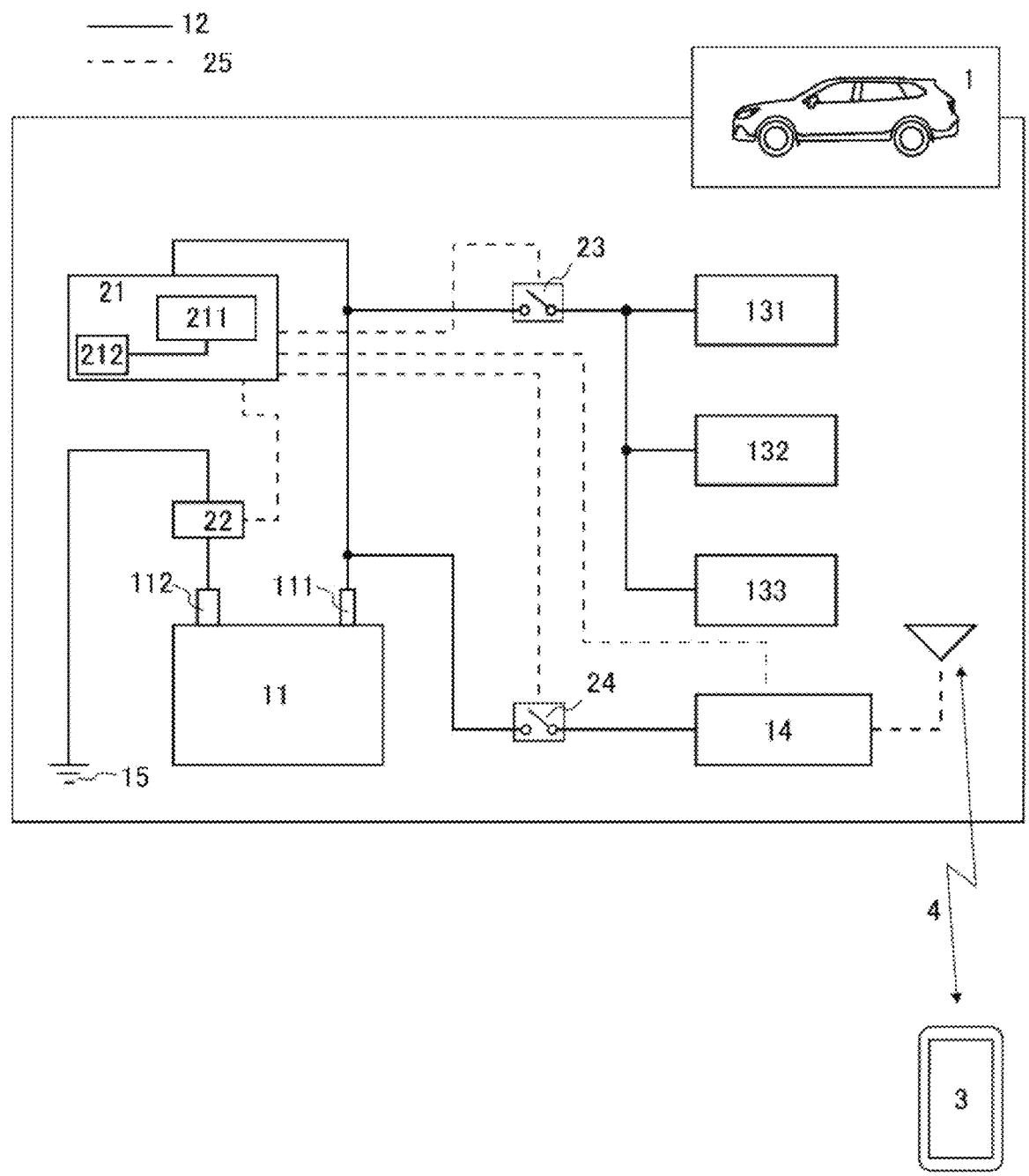
FIG. 1 is a diagram illustrating an example of a system for a vehicle according to one example embodiment of the disclosure.

Before a vehicle starts, an ECU mounted in the vehicle is basically in a sleep mode and does not consume much electric power. However, the vehicle is provided with a plurality of ECUs. A cooperation of such ECUs results in various conditions. A rare condition which is difficult to be dealt with software can prevent the ECUs from being in the sleep mode. This can cause battery depletion.

Sometimes, a third party apparatus may be used as an in-vehicle apparatus such as a car navigation system. When the third party apparatus is mounted in a vehicle, some ECUs can be prevented from being switched to the sleep mode, for example, due to an unexpected routine among the ECUs.

It is desirable to provide a battery depletion prevention system for a vehicle, a battery depletion prevention method, and a non-transitory recording medium that each make it possible to prevent occurrence of a situation in which depletion of a battery, due a device such as an ECU being not switched to a sleep mode, prevents a user from using the battery when the user wants to use the battery.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a system for a vehicle 1 according to an example embodiment of the disclosure. The vehicle 1 may be provided with a battery 11. The battery 11 may include a power-supply terminal 111 coupled to, for example, various in-vehicle apparatuses 131 to 133 and an external communication apparatus 14 via a power-supply line 12. The in-vehicle apparatuses 131 to 133 may each be an apparatus such as an engine control apparatus, a door-lock control apparatus, a vehicle display apparatus, or a car navigation system. The battery 11 may include another power-supply terminal 112 coupled to the ground 15 via a power-supply monitoring apparatus 22.

FIG. 1 also illustrates a battery depletion prevention system according to the example embodiment of the disclosure. The battery depletion prevention system may include, for example but not limited to, a turn-off control apparatus 21, the power-supply monitoring apparatus 22, a first switch 23, and a second switch 24. The turn-off control apparatus 21 may include a computer including a processor 211 and a memory 212, and may include an ECU. The processor 211 may include one processor, or may include a plurality of processors. The memory 212 may include one memory, or may include a plurality of memories. In one example, a plurality of ECUs may cooperate to serve as the turn-off control apparatus 21. The turn-off control apparatus 21 may be coupled to the power-supply terminal 111 by the power-supply line 12. The in-vehicle apparatuses 131 to 133 may each be coupled to the power-supply terminal 111 via the first switch 23 and the power-supply line 12. The external communication apparatus 14 may be coupled to the power-supply terminal 111 via the second switch 24 and the power-supply line 12. The power-supply monitoring apparatus 22 may be attached to the power-supply line 12 coupled to the power-supply terminal 112, and may be provided between the power-supply terminal 112 and the ground 15.

The power-supply monitoring apparatus 22, the first switch 23, and the second switch 24 of the battery depletion prevention system may each be coupled to the turn-off control apparatus 21 via a communication line 25. The power-supply monitoring apparatus 22 may monitor a current flowing between the power-supply terminal 112 and the ground 15, and may supply a value of the current to the turn-off control apparatus 21 via the communication line 25. In addition, the turn-off control apparatus 21 may be configured to turn off or on each of the first switch 23 and the second switch 24 via the communication line 25. In addition, the turn-off control apparatus 21 may be configured to be coupled to a telecommunications carrier network 4 via the communication line 25 and the external communication apparatus 14, and to thereby communicate with a smartphone 3. In one embodiment, the smartphone 3 may serve as a "user terminal".

Figure 2:
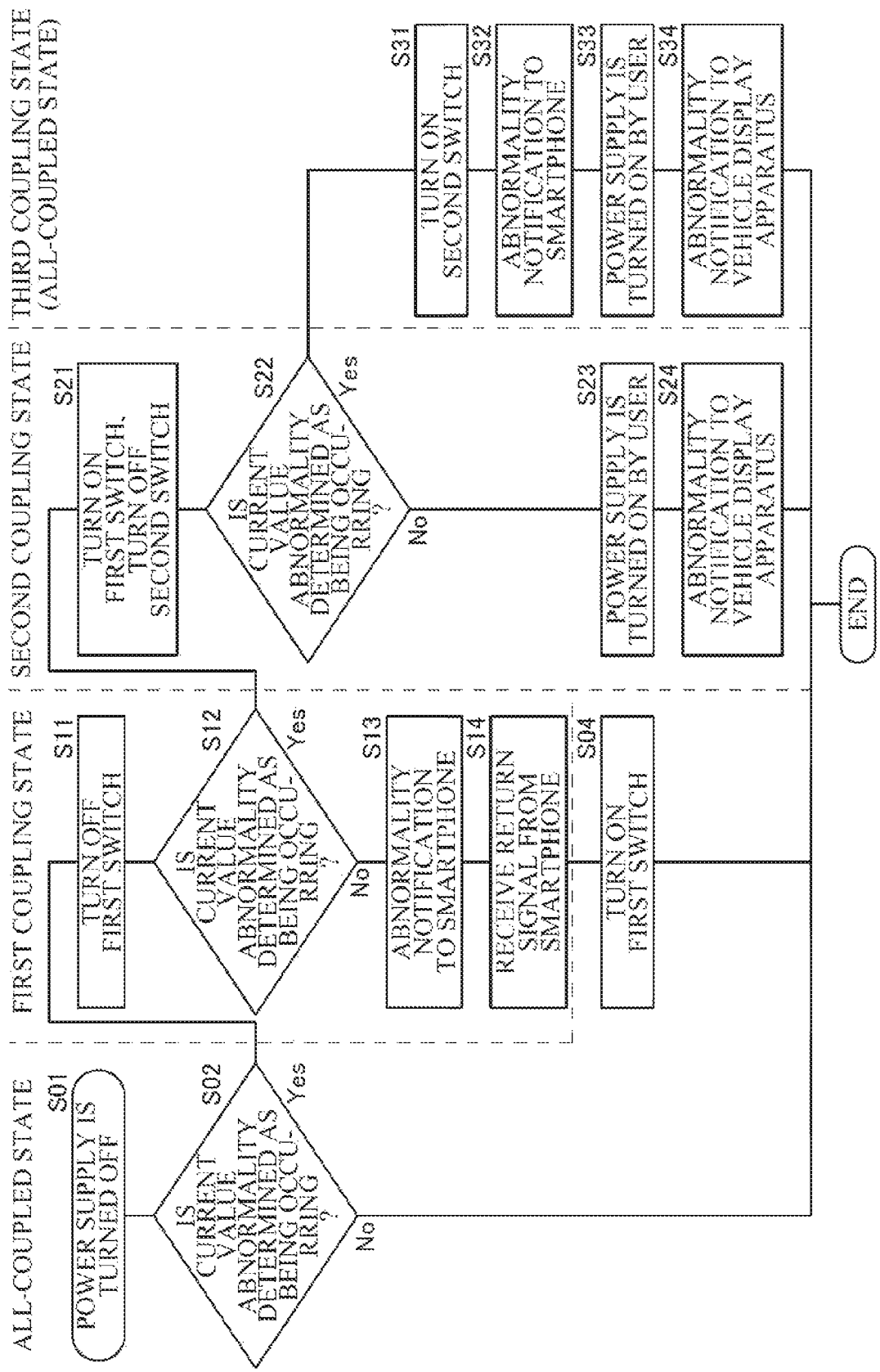
FIG. 2 is a flowchart illustrating an example of battery depletion prevention according to the example embodiment of the disclosure.

Next, a description is given of a process in a battery depletion prevention method according to the example embodiment of the disclosure with reference to FIG. 2. In the process illustrated in FIG. 2, each step may be executed by means of a program. The program may be stored in a computer-readable recording medium. In step S01, when a power supply of the vehicle 1 is turned off, the first switch 23 and the second switch 24 may both be in an ON state, and the battery depletion prevention system may be in an all-coupled state. When the power supply of the vehicle 1 is in an OFF state, the in-vehicle apparatuses 131 to 133, which include the ECUs, and the external communication apparatus 14 may each be in a sleep mode, and a value of the current may be small. A dark current at this time may be collected and flow between the power-supply terminal 112 and the ground 15. This may allow the power-supply monitoring apparatus 22 to monitor the dark current in the all-coupled state.

When the power supply of the vehicle 1 is turned off in step S01, the power-supply monitoring apparatus 22 may detect a current value of the dark current, and supply the detected current value to the turn-off control apparatus 21. In a first determination step S02, the turn-off control apparatus 21 may determine whether current value abnormality is occurring based on the current value detected by and supplied from the power-supply monitoring apparatus 22. Usually, the dark current, which is the collected currents of the ECUs in the sleep mode, may have a small current value. However, if any ECU among the in-vehicle apparatuses 131 to 133 and the external communication apparatus 14 is not in the sleep mode, the current value may increase. If the dark current is greater than a predetermined value, the turn-off control apparatus 21 may determine that the current value abnormality is occurring. If the dark current is not determined as being greater than the predetermined value (step 02: No), the process may be ended.

If the current value abnormality is determined as being occurring in the first determination step S02 (step S02: Yes), in a first coupling step S11, the turn-off control apparatus 21 may turn off the first switch 23 and thereby bring the battery depletion prevention system 2 into a first coupling state. Further, in a second determination step S12, the turn-off control apparatus 21 may determine whether the current value abnormality is occurring in the first coupling state. If the current value abnormality is not determined as being occurring (step S12: No), in a first abnormality notification step S13, the turn-off control apparatus 21 may notify the smartphone 3, which serves as the user terminal, of abnormality via components including, without limitation, the external communication apparatus 14, i.e., the turn-off control apparatus 21 may perform abnormality notification to the smartphone 3 via components including, without limitation, the external communication apparatus 14. In the first coupling state, the first switch 23 may be turned off but the second switch 24 may be turned on, and thus, the external communication apparatus 14 may be coupled to the battery 11 and thereby receive electric supply. In addition, based on the determination that the current value abnormality is not occurring while the external communication apparatus 14 is coupled to the battery 11, it may be assumable that the external communication apparatus 14 is operating normally. Therefore, the turn-off control apparatus 21 may perform the abnormality notification to the smartphone 3 via the external communication apparatus 14.

The smartphone 3 having received the abnormality notification may be configured to transmit a return signal to the battery depletion prevention system with use of application software. Before getting in the vehicle 1, a user may transmit the return signal by operating the smartphone 3. When the return signal is transmitted, in step S14, the turn-off control apparatus 21 may receive the return signal via components including, without limitation, the external communication apparatus 14. Further, in a return step S04, the turn-off control apparatus 21 may turn on the first switch 23 to bring the battery depletion prevention system into the all-coupled state. Thus, the in-vehicle apparatuses 131 to 133 may each be coupled to the battery 11, which may allow the ECUs in the apparatuses including, without limitation, the door-lock control apparatus and the engine control apparatus to receive electric power. This may allow the user to unlock the door, and drive the vehicle 1, for example, to a dealer to ask for repairment.

If the current value abnormality is determined as being occurring in the second determination step S12 in the first coupling state (step S12: Yes), it may be assumed that the current value abnormality is occurring in the external communication apparatus 14. Therefore, the turn-off control apparatus 21 may refrain from performing the abnormality notification to the smartphone 3. Further, in a second coupling step S21, the turn-off control apparatus 21 may turn on the first switch 23 and turn off the second switch 24 and thereby achieve a second coupling state. Also in the second coupling state, the turn-off control apparatus 21 may determine whether the current value abnormality is occurring in a third determination step S22. If the current value abnormality is not determined as being occurring in the third determination step S22 (step S22: No), when the power supply is turned on by the user and the vehicle 1 is thereby started in step S23, the turn-off control apparatus 21 may notify the vehicle display apparatus of abnormality and cause a content indicating abnormality to be displayed on a vehicle screen in a second abnormality notification step S24. When the content indicating the abnormality is displayed, it has been determined that the current value abnormality is not occurring in the second coupling state. It is therefore assumable that the apparatuses including, without limitation, the door-lock control apparatus, the vehicle display apparatus, and the engine control apparatus do not involve a cause of the current value abnormality, and therefore operate normally. This may allow the user to drive the vehicle 1, for example, to a dealer to ask for repairment.

If the current value abnormality is determined as being occurring in the third determination step S22 (step S22: Yes), the turn-off control apparatus 21 may turn on the second switch 24 to achieve the all-coupled state, which is a third coupling state, in a third coupling step S31. Further, in a third abnormality notification step S32, the turn-off control apparatus 21 may attempt to perform the abnormality notification to the smartphone 3. If the power supply of the vehicle 1 is turned on by the user in step S33, the turn-off control apparatus 21 may attempt to notify the vehicle display apparatus of abnormality and cause the content indicating the abnormality to be displayed. The steps S32 to S34 may correspond to a case where both the external communication apparatus 14 and any of the in-vehicle apparatuses 131 to 133 involve causes of the current value abnormality, which may be a very rare situation. Although such a case is a very rare situation, in the example embodiment, the turn-off control apparatus 21 may attempt both to perform the abnormality notification to the smartphone 3 and to cause the content indicating the abnormality to be displayed by the vehicle display apparatus.

Figure 3:
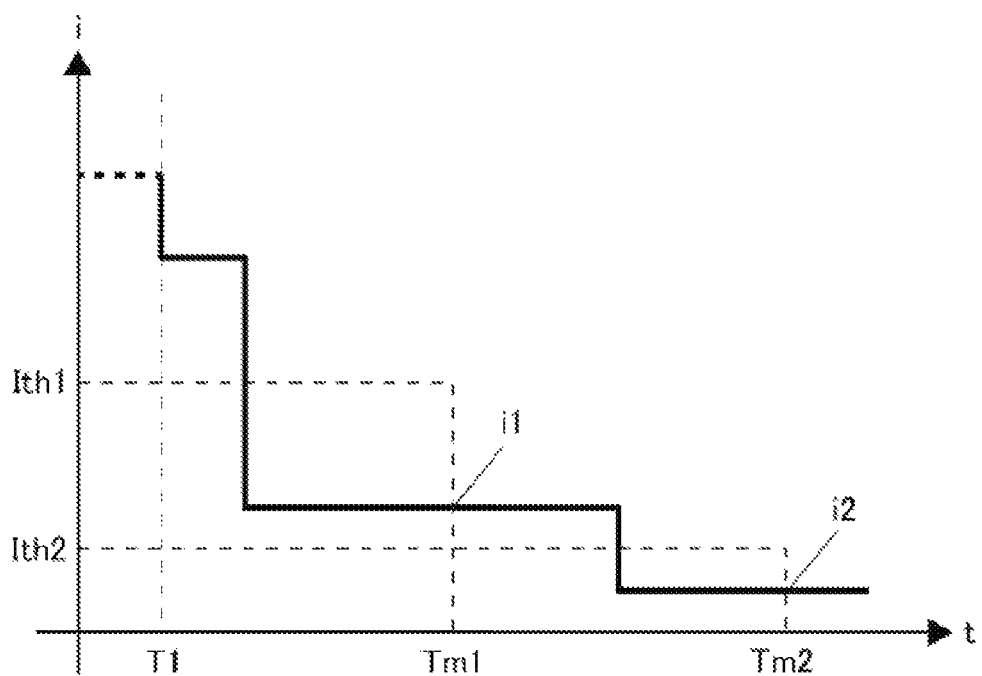
FIG. 3 is a graph illustrating a determination as to whether current value abnormality is occurring after a power supply is turned off, according to the example embodiment of the disclosure.

FIG. 3 is an example graph for describing variation in the dark current after the power supply is turned off in step S01 and describing the determination as to whether the current value abnormality is occurring. After the power supply is turned off, the dark current may gradually decrease, for example, because a period for being switched to the sleep mode differs among the ECUs. In the graph in FIG. 3, the horizontal axis represents a time "t", and the vertical axis represents a current value "i". When the power supply is turned off at a timing T1, the current value i of the dark current may gradually decrease as indicated by a thick line.

Accordingly, in the example embodiment, the turn-off control apparatus 21 may acquire the current value from the power-supply monitoring apparatus 22 twice after the timing T1 and determine whether the current value abnormality is occurring in the first determination step S02. First, the turn-off control apparatus 21 may acquire a current value i1 at a timing Tm1 after the timing T1.

If the current value it is greater than or equal to a current threshold Ith1 (current value i1≥current threshold Ith1), the turn-off control apparatus 21 may determine that the current value abnormality is occurring, and may achieve the first coupling state in the first coupling step S11.

If the current value abnormality is not determined as being occurring at the timing Tm1, the turn-off control apparatus 21 may acquire a current value i2 at a timing Tm2 after the timing Tm1.

If the current value i2 is greater than or equal to a current threshold Ith2 (current value i2≥current threshold Ith2), the turn-off control apparatus 21 may determine the current value abnormality is occurring, and may achieve the first coupling state in the first coupling step S11.

The current threshold Ith1 and the current threshold Ith2 may be stored in the memory 212, and the current threshold Ith1 may be greater than or equal to the current threshold Ith2 (current threshold Ith1≥current threshold Ith2).

In the example illustrated in FIG. 3, the current value i1 may be smaller than the current threshold Ith1, and the current value i2 may be smaller than the current threshold Ith2. Therefore, the current value abnormality may not be detected. If the current value i1 reaches a value greater than or equal to the current threshold Ith1, the turn-off control apparatus 21 may determine that the current value abnormality is occurring at that timing when the current value it reaches the value greater than or equal to the current threshold Ith1, and may not acquire the current value for the second time.

As illustrated in FIG. 3, in the example embodiment, the current threshold Ith2 for the timing Tm2 may be set to be smaller than the current threshold Ith1 for the timing Tm1. Gradually decreasing the current threshold from the timing when the power supply is turned off in such a manner makes it possible to reliably, and at an early timing, detect the current value abnormality of the dark current whose current value decreases gradually.

In the example embodiment, if the current value abnormality is not determined as being occurring at the timing Tm1, and if the current value abnormality is not determined as being occurring at the timing Tm2 either, the process of the battery depletion prevention may be ended. However, in one example, the dark current may be detected predetermined times after the timing Tm2 to determine whether the current value abnormality is occurring. In another example, the dark current may be detected periodically at predetermined intervals after the timing Tm2 to determine whether the current value abnormality is occurring.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Further, techniques according to the example embodiments and their modification examples described above may be combined in any combination unless any particular contradiction or issue occurs in terms of a purpose, a configuration, etc., thereof.

At least one embodiment of the disclosure makes it possible to start a vehicle at an earlier timing while preventing, before the vehicle starts, a situation in which depletion of a battery prevents a user from using the battery when the user wants to use the battery. Non-limiting examples of a cause of the depletion of the battery may include a rare condition which is difficult to be dealt with software, coupling of a third party apparatus, a malfunction such as electric leakage. In addition, at least one embodiment of the disclosure helps to suppress battery depletion when the vehicle is not started for a long time, for example, due to a vacation, by performing shutdown in accordance with a user operation.

The battery depletion prevention system illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the battery depletion prevention system illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the battery depletion prevention system illustrated in FIG. 1.

The invention claimed is:

1. A battery depletion prevention system for a vehicle, the battery depletion prevention system comprising:
    a power-supply monitoring apparatus configured to monitor a value of a current flowing through a battery;
    a first switch provided between the battery and an in-vehicle apparatus and not between the battery and a communication apparatus; and
    a turn-off control apparatus configured to:
        determine, based on the value of the current detected by the power-supply monitoring apparatus, whether current value abnormality is occurring;
        upon determining that the current value abnormality is occurring, turn off the first switch and thereby achieve a first coupling state; and
        upon determining that the current value abnormality is no longer occurring in the first coupling state, perform abnormality notification to a user terminal of a user of the vehicle via the communication apparatus, wherein the user terminal is not part of the vehicle and is configured to externally interact with the vehicle.

2. The battery depletion prevention system according to claim 1, wherein the turn-off control apparatus is configured to turn on the first switch when the communication apparatus receives a return signal from the user terminal in the first coupling state.

3. The battery depletion prevention system according to claim 1, further comprising
    a second switch provided between the battery and the communication apparatus, wherein
    the turn-off control apparatus is configured to,
    upon determining that the current value abnormality is occurring in the first coupling state, achieve a second coupling state in which the first switch is turned on and the second switch is turned off, and
    upon determining that the current value abnormality is not occurring in the second coupling state, refrain from performing the abnormality notification to the user terminal.

4. The battery depletion prevention system according to claim 3, wherein the turn-off control apparatus is configured to, upon determining that the current value abnormality is not occurring in the second coupling state, cause a content indicating abnormality to be displayed on a vehicle screen upon starting of a vehicle.

5. The battery depletion prevention system according to claim 3, wherein the turn-off control apparatus is configured to, upon determining that the current value abnormality is occurring in the second coupling state, achieve a third coupling state in which the second switch is turned on, attempt to perform the abnormality notification to the user terminal via the communication apparatus, and attempt to cause a content indicating abnormality to be displayed on a vehicle screen of the vehicle upon starting of the vehicle by the user.

6. A battery depletion prevention method comprising
    determining whether current value abnormality is occurring in a battery after a power supply of a vehicle is turned off,
    when the current value abnormality is determined as being occurring in the battery, turning off a first switch and thereby achieving a first coupling state, the first switch being provided between the battery and an in-vehicle apparatus and not between the battery and a communication apparatus,
    determining whether the current value abnormality is occurring in the battery after the first coupling state is achieved, and
    when the current value abnormality is not determined as being occurring, performing abnormality notification to a user terminal of a user of the vehicle via the communication apparatus, wherein the user terminal is not part of the vehicle and is configured to externally interact with the vehicle.

7. The battery depletion prevention method according to claim 6, further comprising turning on the first switch when a return signal is received from the user terminal after the abnormality notification to the user terminal is performed.

8. The battery depletion prevention method according to claim 6, further comprising
    when the current value abnormality is determined as being occurring in the first coupling state, achieving a second coupling state in which the first switch is turned on and a second switch is turned off, the second switch being provided between the battery and the communication apparatus,
    determining whether the current value abnormality is occurring in the battery in the second coupling state, and when the current value abnormality is not determined as being occurring, refraining from performing the abnormality notification to the user terminal.

9. The battery depletion prevention method according to claim 8, further comprising notifying a vehicle display apparatus of abnormality when the current value abnormality is not determined as being occurring in the second coupling state and the power supply of the vehicle is turned on.

10. The battery depletion prevention method according to claim 8, further comprising
when the current value abnormality is determined as being occurring, achieving a third coupling state in which the first switch and the second switch are turned on, and
in the third coupling state, attempting to perform the abnormality notification to the user terminal via the communication apparatus, and attempting to cause a content indicating abnormality to be displayed on a vehicle screen when the power supply of the vehicle is turned on.

11. A non-transitory computer-readable recording medium containing a program, when executed by a computer, causing the computer to:
determine whether current value abnormality is occurring in a battery after a power supply of a vehicle is turned off;
when the current value abnormality is determined as being occurring in the battery, turn off a first switch and thereby achieving a first coupling state, the first switch being provided between the battery and an in-vehicle apparatus and not between the battery and a communication apparatus;
determine whether the current value abnormality is occurring in the battery in the first coupling state; and
when the current value abnormality is not determined as being occurring, perform abnormality notification to a user terminal of a user of the vehicle via the communication apparatus, wherein the user terminal is not part of the vehicle and is configured to externally interact with the vehicle.

12. The non-transitory computer-readable recording medium according to claim 11, wherein the program causes, when executed by the computer, the computer to turn on the first switch when a return signal is received from the user terminal.

13. The non-transitory computer-readable recording medium according to claim 11, wherein the program causes, when executed by the computer, the computer to:
when the current value abnormality is determined as being occurring in the first coupling state, achieve a second coupling state in which the first switch is turned on and a second switch is turned off, the second switch being provided between the battery and the communication apparatus;
determine whether the current value abnormality is occurring in the battery in the second coupling state; and
when the current value abnormality is not determined as being occurring, refrain from performing the abnormality notification to the user terminal.

14. The non-transitory computer-readable recording medium according to claim 13, wherein the program causes, when executed by the computer, the computer to notify a vehicle display apparatus of abnormality when the current value abnormality is not determined as being occurring in the second coupling state and the power supply of the vehicle is turned on.

15. The non-transitory computer-readable recording medium according to claim 13, wherein the program causes, when executed by the computer, the computer to:
when the current value abnormality is determined as being occurring, achieve a third coupling state in which the first switch and the second switch are turned on; and
in the third coupling state, attempt to perform the abnormality notification to the user terminal via the communication apparatus, and attempt to cause a content indicating abnormality to be displayed on a vehicle screen when the power supply of the vehicle is turned on.

* * * * *